US012614731B2

(12) United States Patent
Wang et al.

(10) Patent No.: US 12,614,731 B2
(45) Date of Patent: Apr. 28, 2026

(54) FLEXIBLE MULTIFUNCTIONAL CROSS-LINKING ADHESIVE, PREPARATION METHOD THEREFOR AND APPLICATION THEREOF

(71) Applicant: Shanghai Jiao Tong University, Shanghai (CN)

(72) Inventors: Jiulin Wang, Shanghai (CN); Jiahang Chen, Shanghai (CN); Jun Yang, Shanghai (CN)

(73) Assignee: Shanghai Jiao Tong University, Shanghai (CN)

( * ) Notice: Subject to any disclaimer, the term of this patent is extended or adjusted under 35 U.S.C. 154(b) by 1078 days.

(21) Appl. No.: 17/761,201

(22) PCT Filed: Dec. 12, 2020

(86) PCT No.: PCT/CN2020/135981
§ 371 (c)(1),
(2) Date: Mar. 17, 2022

(87) PCT Pub. No.: WO2021/164393
PCT Pub. Date: Aug. 26, 2021

(65) Prior Publication Data
US 2022/0376256 A1 Nov. 24, 2022

(30) Foreign Application Priority Data
Feb. 21, 2020 (CN) .......................... 202010107920.9

(51) Int. Cl.
*H01M 4/62* (2006.01)
*H01M 4/04* (2006.01)
(Continued)

(52) U.S. Cl.
CPC ......... *H01M 4/622* (2013.01); *H01M 4/0404* (2013.01); *H01M 4/043* (2013.01);
(Continued)

(58) Field of Classification Search
CPC .... H01M 4/622; H01M 4/0404; H01M 4/043; H01M 4/583; H01M 10/36; H01M 2004/021; H01M 2004/028
See application file for complete search history.

(56) References Cited

U.S. PATENT DOCUMENTS

| | | | | |
|---|---|---|---|---|
| 2009/0136845 A1* | 5/2009 | Choi | ................... | H01M 4/0414 |
| | | | | 429/212 |
| 2013/0313486 A1* | 11/2013 | Sugimori | .............. | H01M 4/623 |
| | | | | 429/217 |
| 2022/0293925 A1* | 9/2022 | Cooke | ................. | H01M 4/1397 |

FOREIGN PATENT DOCUMENTS

| | | |
|---|---|---|
| CN | 1641916 | 7/2005 |
| CN | 101981727 | 2/2011 |

(Continued)

OTHER PUBLICATIONS

EPO machine generated English translation of CN 106531964 A (Year: 2017).*

(Continued)

*Primary Examiner* — Kimberly Wyluda
(74) *Attorney, Agent, or Firm* — JCIPRNET

(57) ABSTRACT

A flexible multifunctional cross-linking adhesive, a preparation method therefor and an application thereof. The adhesive uses guar gum and carboxyl styrene butadiene rubber as raw materials, and is formed by intermolecular cross-linking between hydroxyl groups rich in the guar gum and carboxyl groups contained in the carboxyl styrene butadiene rubber to form a flexible multifunctional cross-linked network. Compared to the prior art, the water-based adhesive is a flexible cross-linking adhesive that has a strong bonding force, high mechanical strength, and no cracking due to tensile deformation, and is insoluble in a battery electrolyte. The adhesive may effectively accommodate the volume effect of a sulfur positive electrode and keep the (Continued)

positive electrode structure intact during a cycling operation. At the same time, the adhesive has significant advantages such as environmental friendliness and being low cost. The compacted sulfur positive electrode has a simple preparation process and has relatively large application prospects.

10 Claims, 10 Drawing Sheets

(51) Int. Cl.
    *H01M 4/583*      (2010.01)
    *H01M 10/36*     (2010.01)
    *H01M 4/02*       (2006.01)

(52) U.S. Cl.
    CPC ........... *H01M 4/583* (2013.01); *H01M 10/36* (2013.01); *H01M 2004/021* (2013.01); *H01M 2004/028* (2013.01)

(56) References Cited

FOREIGN PATENT DOCUMENTS

| | | |
|---|---|---|
| CN | 106531964 | 3/2017 |
| CN | 109768282 | 5/2019 |
| CN | 110770950 | 2/2020 |
| CN | 111293312 | 6/2020 |
| WO | 2018195897 | 11/2018 |

OTHER PUBLICATIONS

Chemical Book—Guar Gum.*
ECHEMI—Carboxylated Styrene-Butadiene latex (XSBR).*
"International Search Report (Form PCT/ISA/210) of PCT/CN2020/135981," mailed on Mar. 3, 2021, with English translation thereof, pp. 1-6.
"Written Opinion of the International Searching Authority (Form PCT/ISA/237) of PCT/CN2020/135981," mailed on Mar. 3, 2021, pp. 1-6.

* cited by examiner

FLEXIBLE MULTIFUNCTIONAL CROSS-LINKING ADHESIVE, PREPARATION METHOD THEREFOR AND APPLICATION THEREOF

CROSS-REFERENCE TO RELATED APPLICATION

This application is a 371 of international application of PCT application serial no. PCT/CN2020/135981, filed on Dec. 12, 2020, which claims the priority benefit of China application no. 202010107920.9, filed on Feb. 21, 2020. The entirety of each of the above mentioned patent applications is hereby incorporated by reference herein and made a part of this specification.

BACKGROUND

Technical Field

The invention belongs to the technical field of multifunctional flexible and crosslinking binder for electrodes. It relates to multifunctional flexible and crosslinking binder, including its preparation method and application in secondary batteries.

Description of Related Art

Lithium-sulfur (Li—S) battery is a rechargeable battery consisting of lithium metal as the anode and sulfur-contained materials (such as elemental sulfur, sulfur-based composites and organic sulfides) as cathode. It is regarded as promising development direction of next-generation batteries due to its high energy density (theoretical capacity density: 1672 mAh/g), long lifespan, high safety, low cost (low price of elemental sulfur) and so on.

Cathode consists of three main components: active material, binder and conductive agent, where binder plays a significant role in sticking active materials and accommodating the volume change. Moreover, compatible binder can enable higher capacity, prolong lifespan and reduced cell resistance. It also has a significant effect on elevating the discharge platform and discharge capacity under high current, reducing the internal resistance during low-speed charging, and improving the fast-charging ability. Thereby, the selection of compatible binder is very important in the electrode preparation process. An ideal binder is required to reveal low ohmic resistance and good structural stability without swelling in the electrolyte. At present, commonly used binders include organic binders that use alcohol as dispersant, such as polytetrafluoroethylene (PTFE), polyvinylidene fluoride (PVDF), and aqueous binders that use water as dispersant, such as sodium carboxymethyl cellulose (CMC), styrene butadiene rubber (SBR).

Among the reported binders, organic binders and aqueous SBR binder exhibit poor compatibility with sulfur-based cathode, which deliver low sulfur utilization. In contrast, the aqueous binders rich in polar groups, such as CMC, guar gum (GG), polyacrylic acid (PAA), can enable excellent electrochemical performance of cathode with low sulfur loading. However, cathode with high sulfur loading is required to increase areal capacity of Li—S battery. Aimed to compete with currently commercialized lithium-ion battery and be used in the field of hybrid and pure electric vehicles, an areal capacity over 4 mAh/cm² is necessary for Li—S battery. Unfortunately, when applied in high-sulfur loading cathode, the above-mentioned binders reveal unsatisfactory results because their inferior flexibility and weak mechanical strength can not maintain the structural stability of high-sulfur loading cathode. Thereby, it is urgent and crucial to explore a novel binder with excellent flexibility and good compatibility with sulfur-based cathode.

SUMMARY

Preparation of high-loading and dense cathode accounts greatly for practical Li—S battery with high energy density. It is worth exploring novel effective binder which can maintain the structural stability of high-loading cathode during cycling. Meanwhile, dense electrode with reduced thickness can be obtained via suitable pressure treatment.

The purpose of this invention is to provide a preparation method of multifunctional flexible and crosslinking binder in order to overcome the defects of the binders in previous reports.

The purpose of this invention can be achieved through the following technical solutions:

This invention prepares a multifunctional flexible and crosslinking binder. The cross-linking binder uses guar gum (GG) and carboxylic styrene butadiene rubber (SCR) as raw materials. Multifunctional flexible and crosslinking network can be formed via intermolecular cross-linking between hydroxyl groups contained in GG and carboxyl group of SCR.

The proposed binder reveals excellent flexibility, enhanced mechanical strength and good compatibility with sulfur-based cathode. The constructed network can effectively accommodate the volume change of cathode, which ensures stable cathode structure and high sulfur utilization.

As a preferred technical solution, the mass ratio of the GG to SCR ranges from 9:1 to 1:9.

As a preferred technical solution, the mass ratio of the GG to SCR ranges from 3:1 to 1:3.

This invention aims to combine the superiorities of two kinds of aqueous binders, such as high viscosity of GG and good flexibility of SCR and form a crosslinking network. Overhigh content of GG or SCR cannot achieve the superiority efficiently.

As a preferred technical solution, SCR is prepared via introduction of polar carboxyl group on commercialized SBR and the carboxylation degree ranges from 3% to 20%. The 50 wt. % SCR/H₂O solution is milky white liquid with a pH of 6-8 and a viscosity of 20-350 mPa·s. The optional brands of SCR include AD5009, AD5010, 0125115, 165, 021252 or FSDB50.

The second highlight of this invention is the preparation method of multifunctional flexible and crosslinking binder. A co-solution method is adopted to cross-link GG and SCR.

The third highlight of this invention is the application of multifunctional flexible and crosslinking binder. A mixture of this multifunctional flexible and crosslinking binder, sulfur-contained material and conductive agent is well dispersed in water in a mass loading of (7-9):(0.5-1.5):(0.5-1.5) to obtain a viscous slurry. The slurry is coated on current collector and tried in vacuum. After totally drying, suitable pressure treatment is conducted to obtain dense cathode for Li—S battery.

A viscous milky white solution can be obtained via mixing GG aqueous solution and SCR aqueous solution in specific mass ratio and then stirring for 1-3 hours. Then drip-cast it onto tetrafluoroethylene platform and heat for 6-12 hours at 50-90° C. to obtain a flexible cross-linked film. When adopting it to the cathode of Li—S battery:

As a preferred technical solution, GG and SCR are dissolved into deionized water respectively to prepare a guar gum aqueous solution and a carboxylic styrene butadiene rubber aqueous solution. Then two aqueous solutions are mixed into viscous milky white solution. The viscous solution is directly used to prepare cathode and an in-situ intermolecular cross-linking occurs during the cathode drying process, which forms a multifunctional flexible network.

As a preferred technical solution, the conductive agent is composed of acetylene black and alternative carbon material, where the alternative carbon material includes carbon nanotube (CNT), carbon nanofibers (CNF), graphene or graphene oxide (GO).

As a preferred technical solution, the conductive agent is composed of acetylene black and alternative carbon material in a mass ratio ranging from 2:1 to 1:4.

As a further preferred technical solution, the conductive agent is composed of acetylene black and carboxylic carbon nanotube (CNTT) in a mass ratio ranging from 2:1 to 1:4.

CNTT partly replaces Super P to fabricate multi-dimensions cathode structure. Meanwhile, the existed carboxyl group of CNTT can further react with hydroxyl groups of GG in the cathode preparation process, enabling more stable cathode structure during cycling.

As a preferred technical solution, sulfurized pyrolyzed poly(acrylonitrile) (S@pPAN) is adopted as the sulfur-contained material. S@pPAN is synthesized via pyrolyzing the mixture of sulfur and poly(acrylonitrile) (PAN) in a mass ratio of (4-16):1 for 1-16 hours at 250-400° C. under $N_2$ or Ar atmosphere.

As a preferred technical solution, the molecular weight of used PAN ranges from 10 K to 1000 K.

As a preferred technical solution, the sulfur content of S@pPAN ranges from 30 wt. % to 70 wt. %.

As a preferred technical solution, the current collectors include aluminum foil, aluminum mesh, carbon-coated aluminum foil, carbon-coated aluminum mesh, nickel mesh or foamed nickel.

As a preferred technical solution, the cathode undergoes pressure treatment of 0-20 MPa to obtain high density. The cathode density after different pressure treatments is 0.8-1.6 g cm-3, corresponding to low porosity of 10%-50%.

High mass loading means increased thickness of the electrodes, leading to a decrease in both ionic and electronic conductivity. Even serious transport hysteresis was observed in thick electrodes, which render low sulfur utilization and poor cycling Pressure treatment can effectively decrease electrode thickness and enable better contact between active material and current collector, rendering higher sulfur utilization. Moreover, the minimized porosity after pressure treatment reasonably reduced the electrolyte amount for wetting electrode without adverse influence on sulfur utilization. The dense electrode after pressure treatment also favors higher volume energy density.

This invention uses GG and SCR as raw materials. Multifunctional flexible and crosslinking network can be formed via intermolecular cross-linking between hydroxyl groups contained in GG and carboxyl group of SCR.

GG can effectively bind active material, conductive agent and current collector. However, when applied in high-loading cathode, the rigidity and poor flexibility cannot accommodate the volume effect of sulfur, thereby causing structural collapse and deceased lifespan. SBR reveals excellent elasticity and flexibility but poor electrochemical compatibility with S@pPAN cathode. To design a novel multifunctional binder possessing both interfacial compatibility and flexibility, polar carboxyl group is introduced in SBR to obtain SCR. Then SCR is crosslinked with hydroxy-rich GG, where GG can work as a 'bridge' to fabricate a crosslinking network. After the crosslinking, merits of both SBR and GG could retain to realize an artificial multifunctional flexible binder (AFB). Moreover, AFB is insoluble in electrolyte.

The multifunctional flexible and crosslinking in this invention is used as an aqueous binder for cathode of Li—S battery. Compared with the cathode using organic binder, it reveals environmentally friendly, non-toxic, low cost, strong adhesion, good dispersion, favorable flexibility, high specific capacity, excellent cycling stability. The AFB-based cathode with high loading of 8 mg cm$^{-2}$ exhibits initial discharge capacity of 1962.4 mAh g$^{-1}$. It reveals stable performance with capacity of 1447.2 mAh g$^{-1}$ after 100 cycles at 0.1 C, corresponding to a high areal capacity of 4.45 mAh cm$^{-2}$. Notably, the capacity loss after 60 cycles was mainly ascribed to the anode issues: dendrite and interfacial reactions with consumption of electrolyte and increase of impedance. After disassembling the cell, the cathode remains compact structure without cracking and structural collapse. The performance can totally recover after assembling with fresh Li anode and new electrolyte, which further illustrated robust cathode structure maintained by novel cross-linked binder. The cycle stability at higher rate is also realized. It delivers excellent areal capacity of 4.29 mAh cm$^{-2}$ after 170 cycles at 0.2 C and maintained 4.00 mAh cm$^{-2}$ after 250 cycles at 0.5 C.

The Li—S battery mentioned above uses electrolyte consisting of 1 M lithium hexafluorophosphate (LiPF$_6$)/ethylene carbonate (EC)-dimethyl carbonate (DMC)-fluoroethylene carbonate (FEC) in volume ratio of 1:1:0.1. The battery is tested in the voltage range of 1.0-3.0 V (vs. Li/Li$^+$).

Notably, LiPF$_6$/DMC-FEC in volume ratio of 1:1 better compatibility and interfacial stability with lithium anode is further adopted as electrolyte. It delivers prolonged lifespan with excellent reversible capacity of 1422.9 mAh g$^{-1}$ corresponding to 4.37 mAh cm$^{-2}$ after 200 cycles at 0.2 C.

The flexible cathode with higher mass loading is further prepared and shows benign electrochemical performances. The cathode with mass loading of 15 mg cm$^{-2}$ exhibits remarkable areal capacity of 8.31 mAh cm$^{-2}$ with superior sulfur utilization of nearly 90%.

To further ameliorate the cathode stability, carboxylic carbon nanotube (CNTT) is partly replaced Super P to fabricate multi-dimensions cathode structure. The mass ratio of CNTT to acetylene black ranges from 2:1 to 1:4. Moreover, the existed carboxyl group can further react with GG in the cathode preparation process. The addition enables more stable cathode structure during cycling even in higher mass loading. The battery in 9.5 mg cm$^{-2}$ performs more stable cycling, holding capacity of 5.19 mAh cm$^{-2}$ (1420.9 mAh g$^{-1}$) after 200 cycles at 0.1 C.

In summary, this invention proposes a multifunctional flexible and crosslinking binder with strong binding force, high mechanical strength. It reveals no cracking after tensile test and insoluble in electrolyte. The flexible network can effectively accommodate the volume effect of sulfur, which enables intact cathode structure during cycling. Moreover, it has significant advantages such as environmental friendliness and low cost. Meanwhile, the simple preparation process of dense sulfur-based cathode holds a larger application prospect.

5

Figure 2:
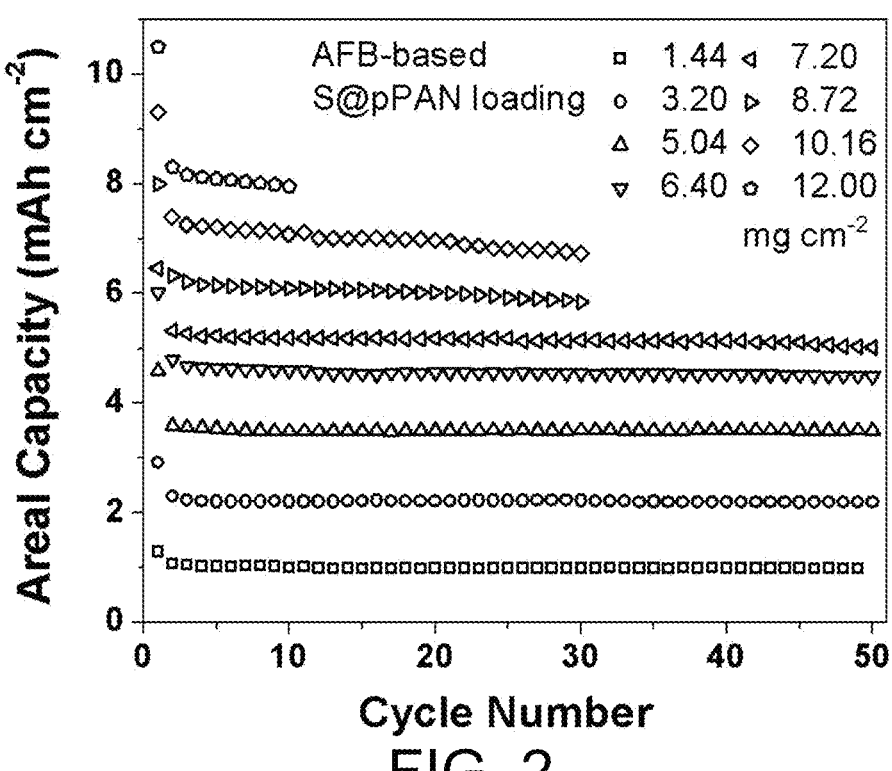

FIG. 2 shows the cycling performance of AFB-based S@pPAN with different loading obtained in Example 1.

Figure 3:
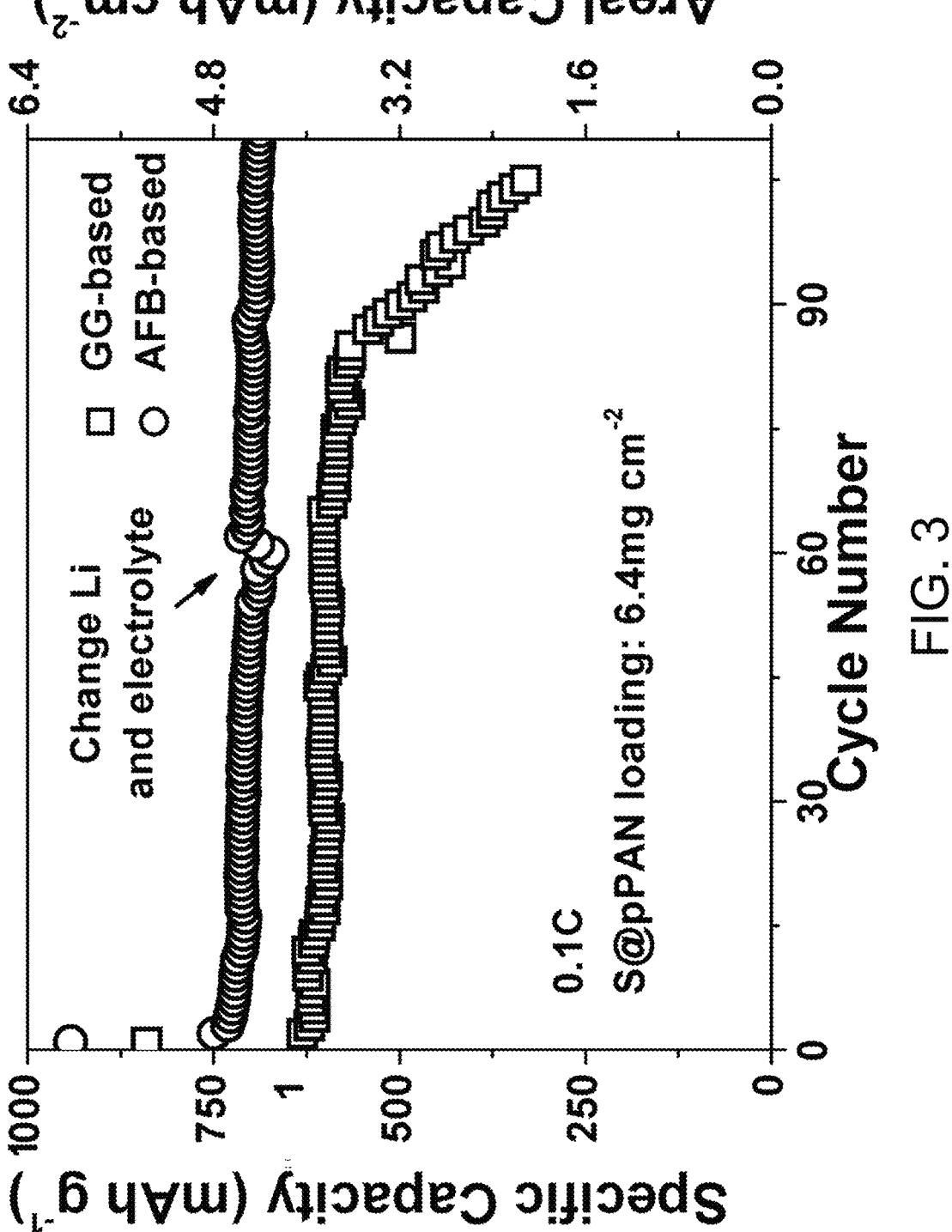

FIG. 3 shows the cycling performance of high-loading S@pPAN using AFB and GG binders obtained in Example 1.

Figure 4:
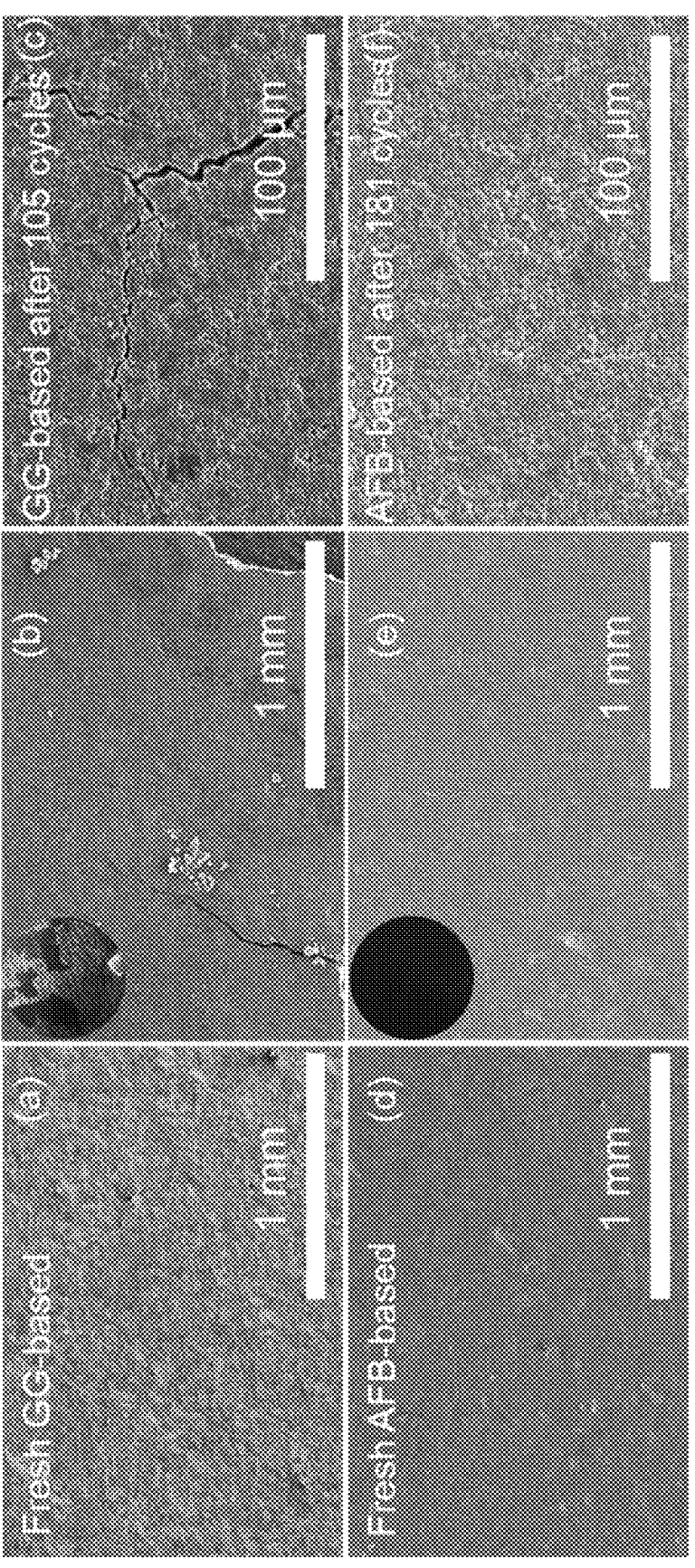

FIG. 4 shows scanning electron microscopy (SEM) images of GG-based S@pPAN after 105 cycles and AFB-based S@pPAN after 181 cycles obtained in Example 1.

Figure 5:
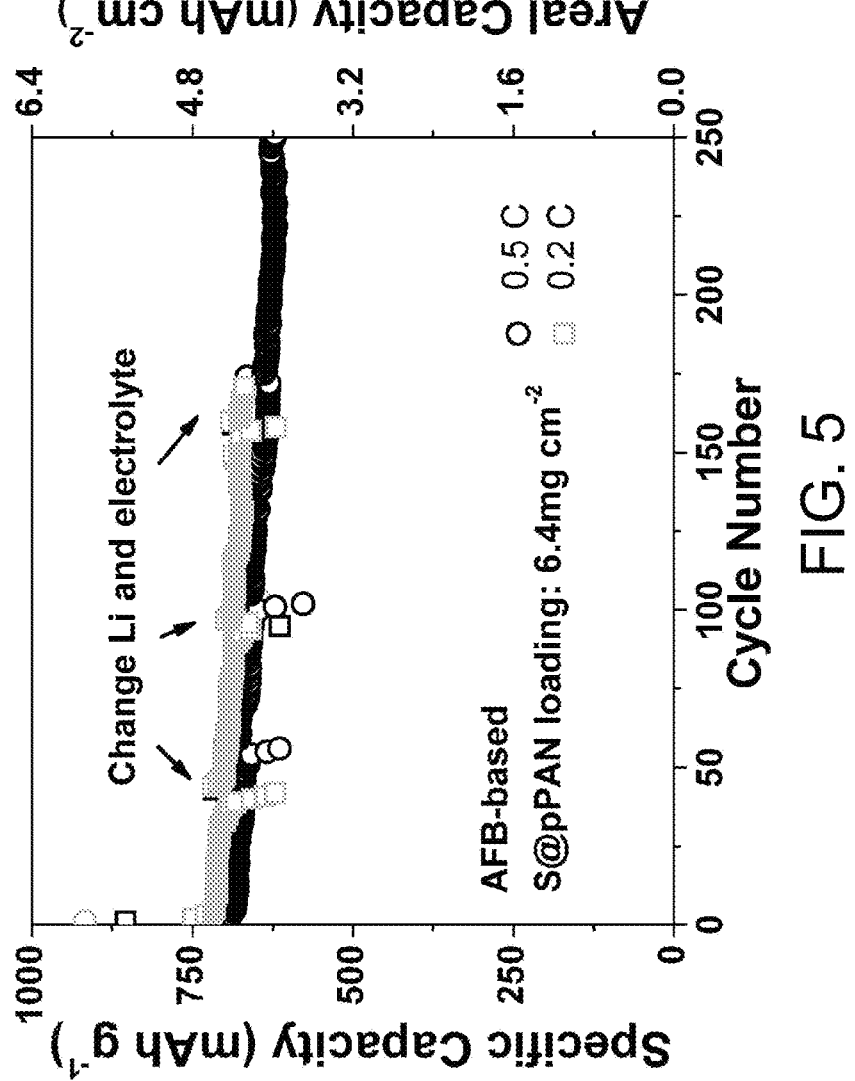

FIG. 5 shows the cycling performance of high-loading AFB-based S@pPAN under high rate obtained in Example 1.

Figure 6:
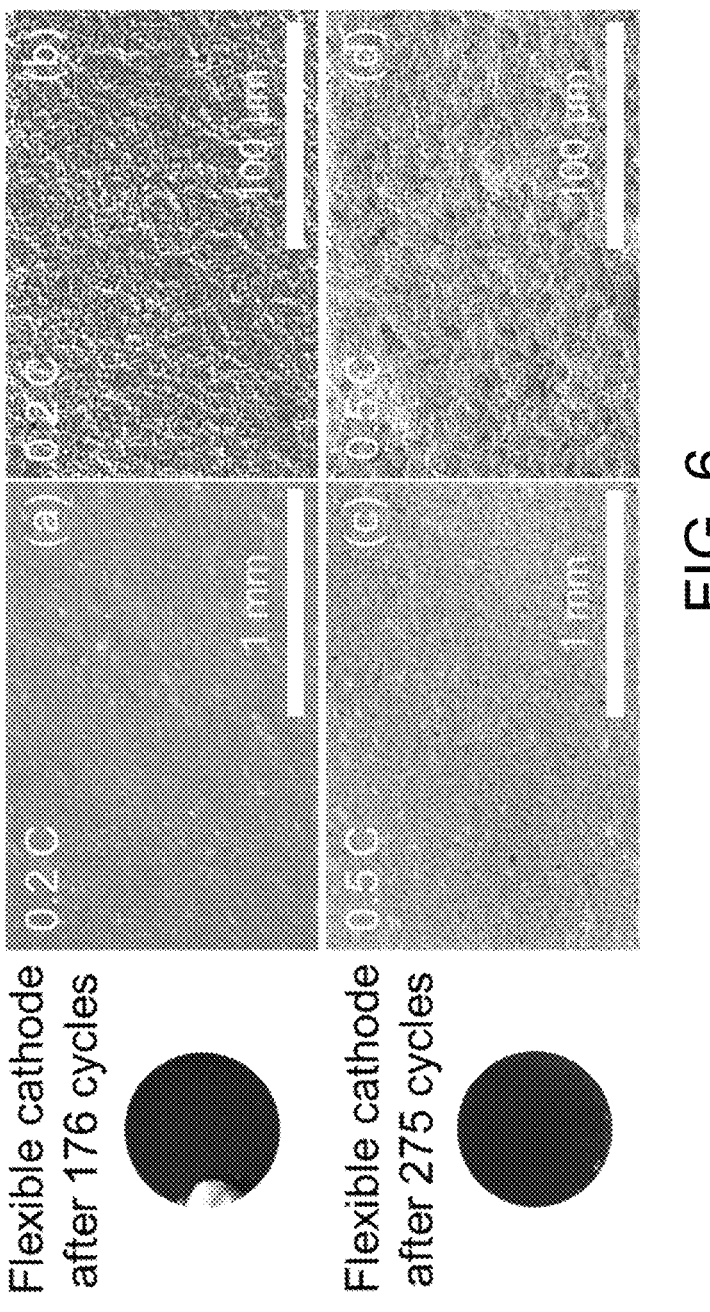

FIG. 6 shows SEM images of AFB-based S@pPAN at 0.2 C after 176 cycles and at 0.5 C after 275 cycles obtained in Example 1.

Figure 7:
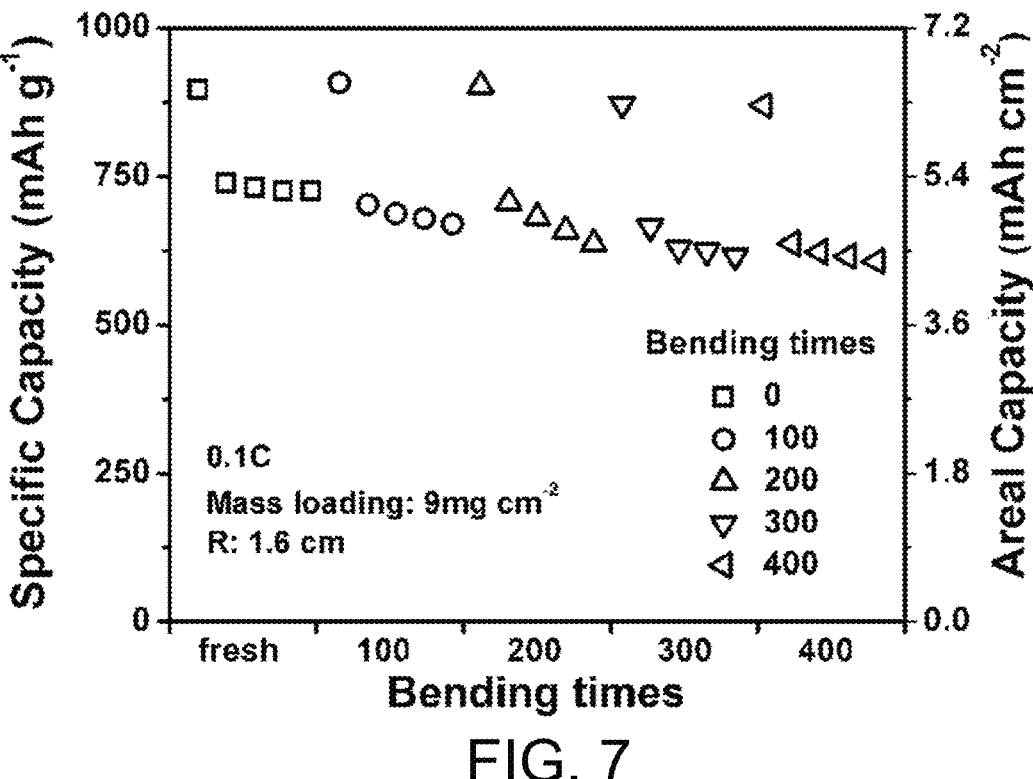

FIG. 7 shows capacity retention of AFB-based S@pPAN after bending obtained in Example 1.

Figure 8:
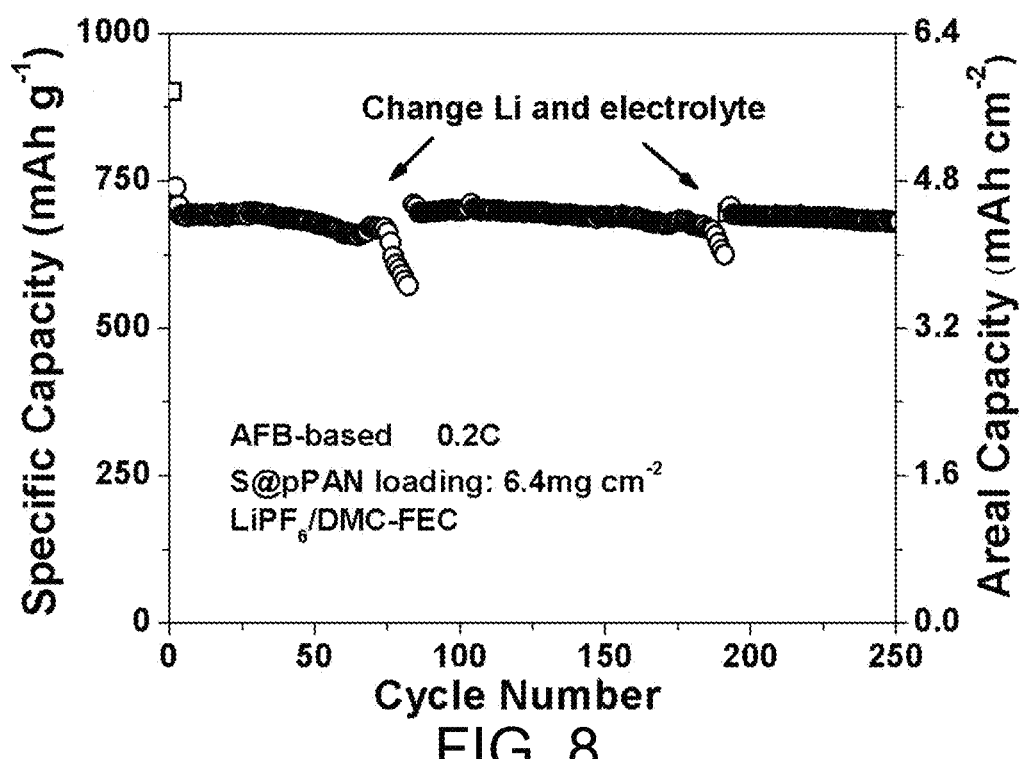

FIG. 8 shows the cycling performance of high-loading AFB-based S@pPAN under high rate obtained in Example 2.

Figure 9:
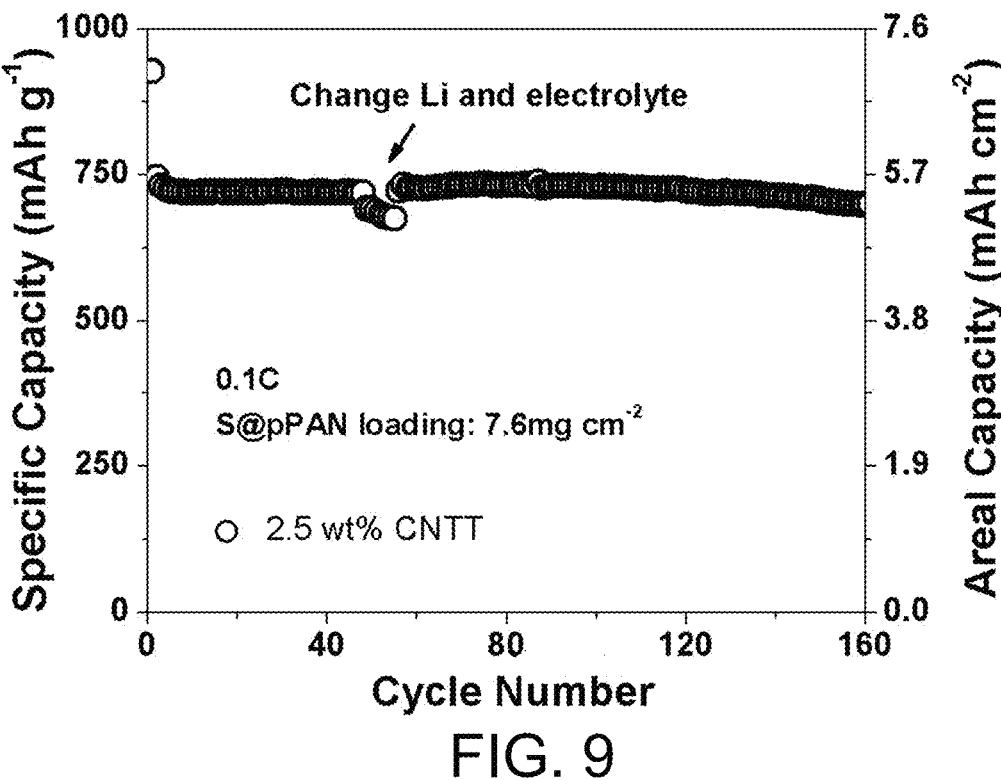

FIG. 9 shows the cycling performance of high-loading AFB-based S@pPAN obtained in Example 3.

Figure 10:
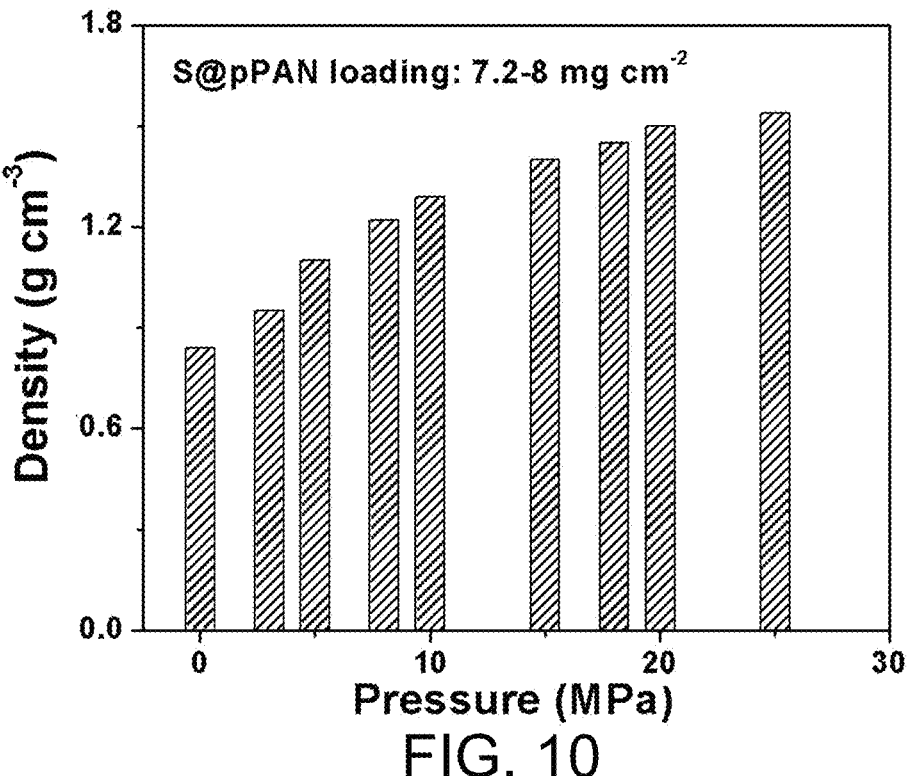

FIG. 10 shows various density of high-loading AFB-based S@pPAN under pressure treatment obtained in Example 4.

Figure 11:
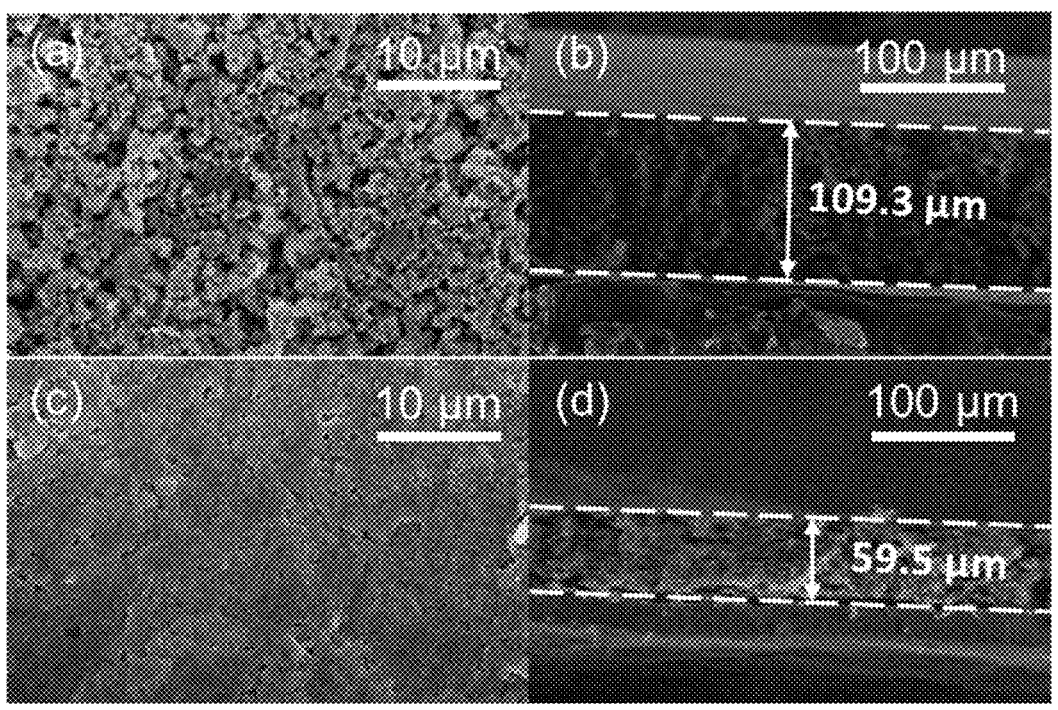

FIG. 11 shows SEM images of high-loading AFB-based S@pPAN without pressure treatment and after pressure treatment in top-view and cross-section obtained in Example 4.

Figure 12:
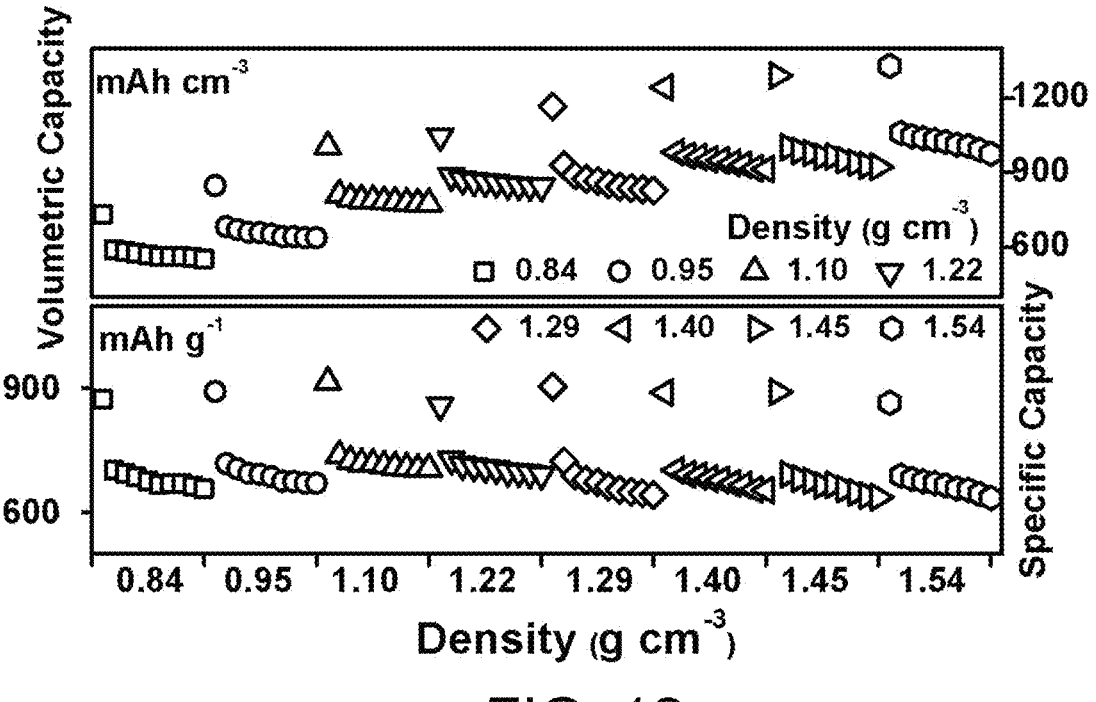

FIG. 12 shows gravimetric and volumetric capacity of high-loading AFB-based S@pPAN in different density obtained in Example 4.

Figure 13:
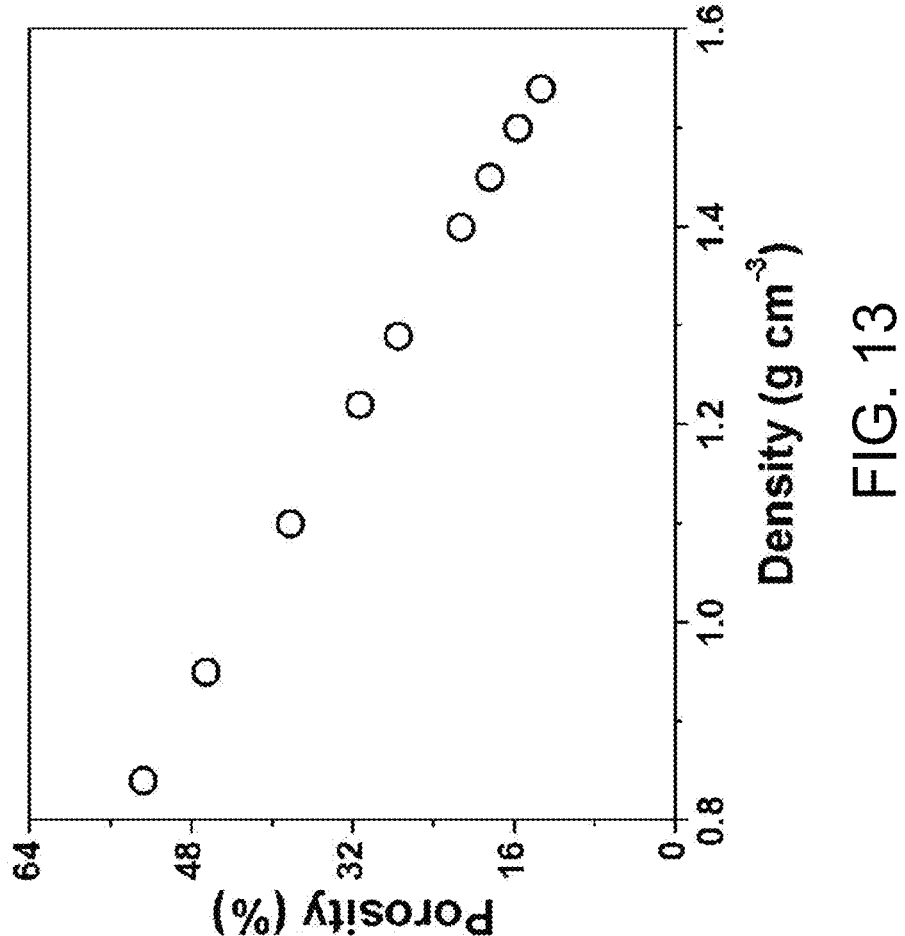

FIG. 13 shows porosity of high-loading AFB-based S@pPAN with different density obtained in Example 4.

Figure 14:
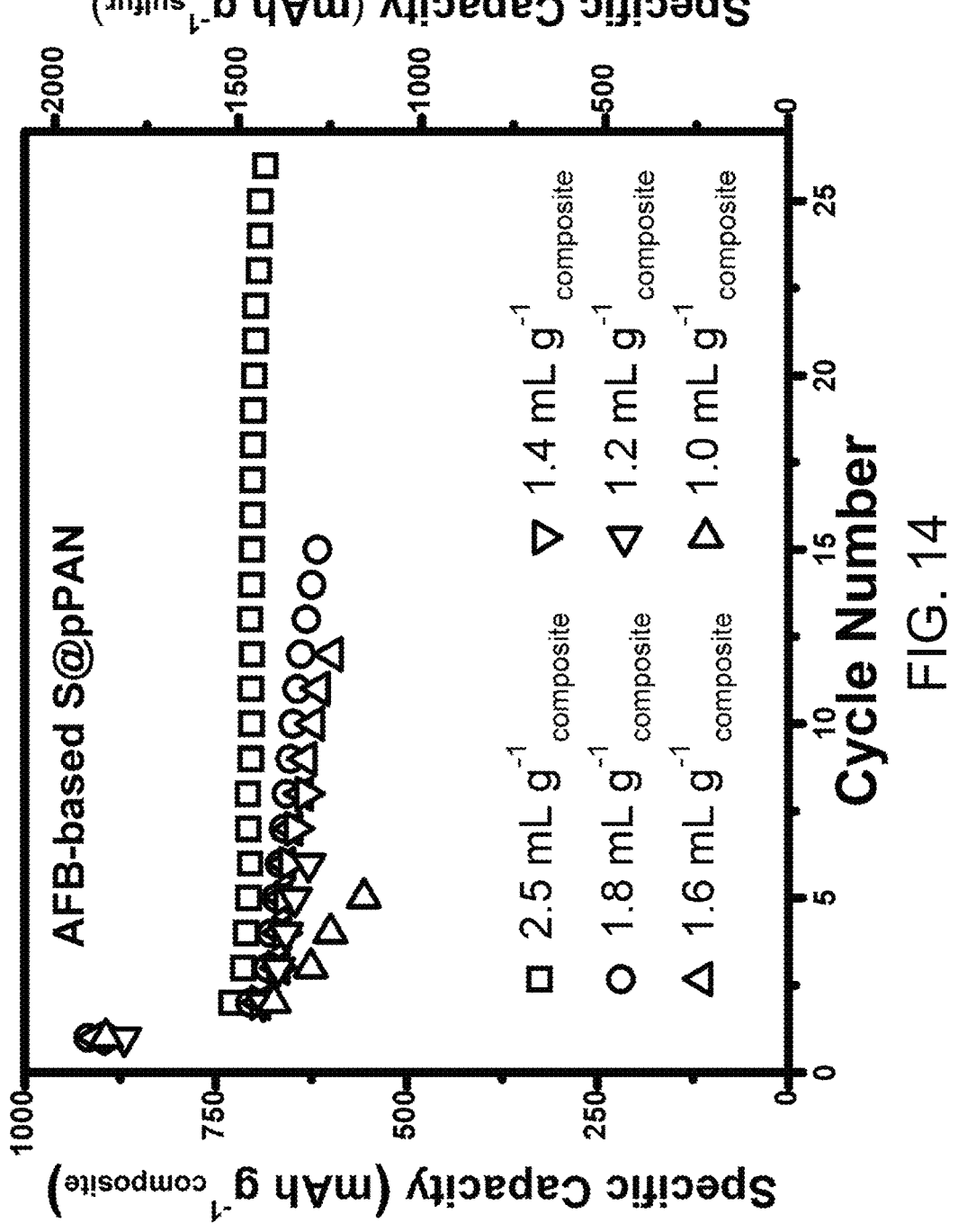

FIG. 14 shows the cycling performance of high-loading AFB-based S@pPAN obtained in Example 5.

DESCRIPTION OF THE EMBODIMENTS

The invention will be described in detail combining the figures and specific examples.

Example 1

A mixture of S@pPAN, AFB and acetylene black is evenly dispersed in deionized water in a mass ratio of 8:1:1. After stirring, a viscous slurry is obtained and casted on carbon-coated aluminum current collector. The cathode is prepared after totally drying with mass loading ranging from 1.6 to 15 mg cm$^{-2}$. The S@pPAN is synthesized via pyrolyzing the mixture of sulfur and PAN in a mass ratio of 10:1 for 10 hours at 300° C. under N$_2$ atmosphere.

Li—S battery is assembled using lithium metal as anode, S@pPAN as cathode and 1 M LiPF$_6$/EC-DMC-FEC (1:1:0.1 in volume). The battery is tested in the voltage range of 1.0-3.0 V (vs. Li/Li$^+$).

Crosslinking AFB is prepared using GG and SCR in mass ratio of 1:1 as raw materials and co-solution method. The carboxylation degree of SCR ranges from 3% to 20%. The 50 wt. % SCR/H$_2$O solution is milky white liquid with a pH of 6-8 and a viscosity of 20-350 mPa·s. The optional brands of SCR include AD5009, AD5010, 0125115, 165, 021252 or FSDB50. The detail preparation is as following: GG and SCR are dissolved into deionized water respectively. Then two aqueous solutions are mixed into viscous milky white solution under stirring for 1-3 hours. The mass ratio of GG and SCR is 1:1. The viscous solution is directly used to prepare cathode and an in-situ intermolecular cross-linking

Figure 1:
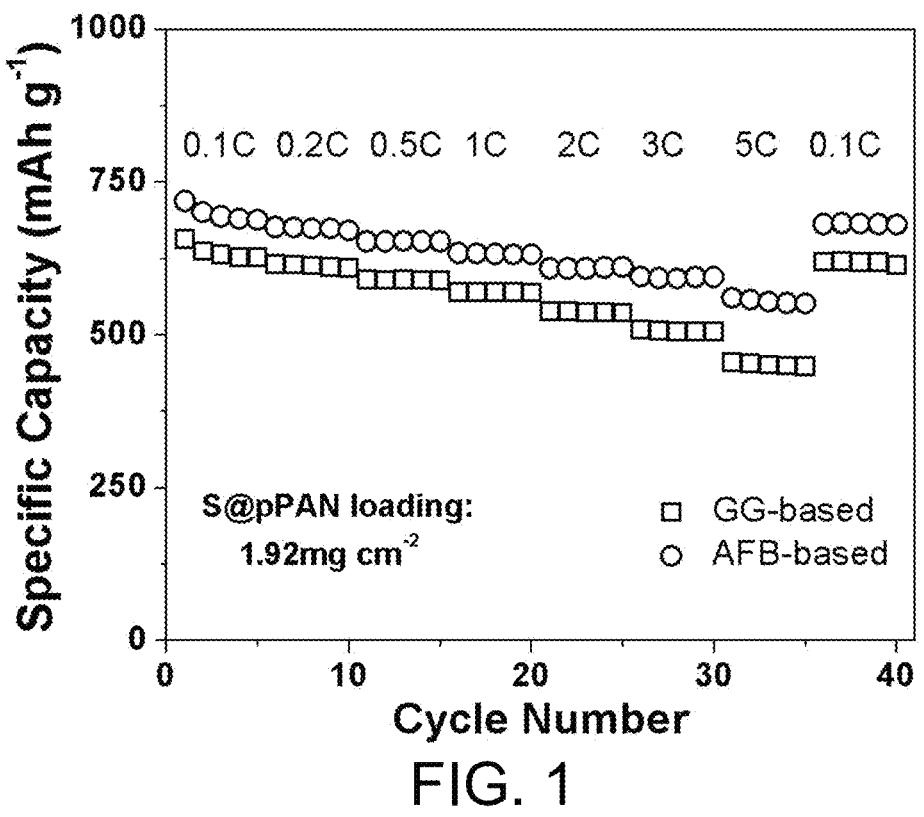
FIG. 1 shows the rate performance of S@pPAN using multifunctional flexible and crosslinking binder-AFB and other binders obtained in Example 1.

6 occurs during the cathode drying process, which forms a multifunctional flexible network. As shown in FIG. 1, the AFB-based cathode with mass loading of 2.4 mg cm$^{-2}$ exhibits remarkable discharge capacity of 1239.0 mAh g$^{-1}$ even at a harsh rate of 5 C, higher than that of GG-based cathode (1053.3 mAh g$^{-1}$).

All the AFB-based cathodes with different mass loading reveals stable cycling with high sulfur utilization near 90%. Even the cathode with mass loading of 15 mg cm$^{-2}$ delivers a sulfur utilization of 90% and a high areal capacity of 8.31 mAh cm$^{-2}$ as shown in FIG. 2.

Moreover, the cycling performance of cathodes with mass loading of 8 mg cm$^{-2}$ using different binders are compared as shown in FIG. 3. At 0.1 C, AFB-based cathode exhibits remarkable initial reversible capacity of 1561.6 mAh g$^{-1}$ and superior cycling stability than that of GG-based cathode. After 100 cycles, the capacity remains 1447.2 mAh g$^{-1}$ with a sulfur utilization of 92.7%, corresponding to a high areal capacity of 4.45 mAh cm$^{-2}$.

The SEM characterization of the surface of different sulfur positive electrodes after the cycle shows that the GG binder positive electrode fell off the current collector in large pieces after the cycle, and the scattered electrode fragments also showed fine cracks; in contrast, AFB bonding The surface structure of the positive electrode is complete and there is no particle deposition, indicating that the AFB binder can effectively buffer the volume effect of the sulfur positive electrode, as shown in FIG. 4 (GG: before cycle (a), after 105 cycles (b) (c); AFB: Before the cycle (d), after 105 laps (e) (f); (a) (b) (d) (e): 200 times magnification; (c) (f): 2000 times magnification).

High rates of a loading of 8 mg/cm$^2$ are conducted on high-loading AFB-based cathodes. It exhibits 4.29 mAh cm$^{-2}$ after 170 cycles at 0.2 C and 4.00 mAh cm$^{-2}$ after 250 cycles at 0.5 C as shown in FIG. 5.

The high-loading cathodes after cycling at high rate are further analyzed via SEM as shown in FIG. 6. AFB-based cathodes reveal uniform surface and compact structure, indicating the AFB can significantly maintain the cathode structural stability. ((a, b) after 176 cycles at 0.2 C; (c, d) after 275 cycles at 0.5 C; (a, c) 200 times magnification; (b, d) 2000 times magnification)

The flexible cathode in 9 mg cm-2 is chosen to evaluate flexibility via bending test as shown in FIG. 7. Compared with the cathode without bending treatment, the capacity retention stabilized at nearly 90% even after 400 times' folding, which delivered superior flexibility and ductility.

Example 2

A mixture of S@pPAN, AFB and acetylene black is evenly dispersed in deionized water in a mass ratio of 8:1:1. After stirring, a viscous slurry is obtained and casted on carbon-coated aluminum current collector. The cathode is prepared after totally drying with mass loading of 8 mg cm$^{-2}$. The S@pPAN is synthesized via pyrolyzing the mixture of sulfur and PAN in a mass ratio of 10:1 for 10 hours at 300° C. under N$_2$ atmosphere. The AFB is prepared using the same method mentioned in Example 1.

Li—S battery is assembled using lithium metal as anode, S@pPAN as cathode and 1 M LiPF$_6$/DMC-FEC (1:1 in volume). The battery is tested in the voltage range of 1.0-3.0 V (vs. Li/Li$^+$).

The AFB-based cathode exhibits enhanced electrochemical performance using more compatible electrolyte. As shown in FIG. 8, after 200 cycles at 0.2 C, it reveals remarkable capacity of 1422.9 mAh g$^{-1}$ and high areal capacity of 4.37 mAh cm$^{-2}$.

Example 3

CNTT is introduced to partly replace Super P. A mixture of S@pPAN, AFB, acetylene black and CNTT is evenly dispersed in deionized water in a mass ratio of 8:1:0.75:0.25. After stirring, a viscous slurry is obtained and casted on carbon-coated aluminum current collector. The cathode is prepared after totally drying with mass loading of 9.5 mg cm$^{-2}$. The S@pPAN is synthesized via pyrolyzing the mixture of sulfur and PAN in a mass ratio of 10:1 for 10 hours at 300° C. under N$_2$ atmosphere. The AFB is prepared using the same method mentioned in Example 1.

Li—S battery is assembled using lithium metal as anode, S@pPAN as cathode and 1 M LiPF$_6$/EC-DMC-FEC (1:1:0.1 in volume). The battery is tested in the voltage range of 1.0-3.0 V (vs. Li/Li$^+$).

CNTT is partly replace Super P to fabricate multi-dimensions cathode structure. Meanwhile, the existed carboxyl group can facilitate the electrolyte penetration and may further react with GG in the cathode preparation process. The addition enabled more stable cathode structure during cycling even in higher mass loading. As shown in FIG. 9, the battery in 9.5 mg cm$^{-2}$ performed more stable cycling with capacity of 1420.9 mAh g$^{-1}$ and 5.19 mAh cm$^{-2}$ after 200 cycles at 0.1 C.

Example 4

A mixture of S@pPAN, AFB and acetylene black is evenly dispersed in deionized water in a mass ratio of 8:1:1. After stirring, a viscous slurry is obtained and casted on carbon-coated aluminum current collector. The cathode is prepared after totally drying with mass loading ranging from 8 to 10 mg cm$^{-2}$. The S@pPAN is synthesized via pyrolyzing the mixture of sulfur and PAN in a mass ratio of 10:1 for 10 hours at 300° C. under N$_2$ atmosphere.

The AFB is prepared using the same method mentioned in Example 1.

Li—S battery is assembled using lithium metal as anode, S@pPAN as cathode and 1 M LiPF$_6$/EC-DMC-FEC (1:1:0.1 in volume). The battery is tested in the voltage range of 1.0-3.0 V (vs. Li/Li$^+$). Especially for the cathode, pressure treatment of 0-25 MPa is conducted after drying to prepare dense cathode.

The relationship of pressure to cathode thickness and density is explored in detail. As shown in FIG. 10, suitable pressure treatment can effectively decrease cathode thickness and increase cathode density, which favors to higher volume energy density.

FIG. 11 compares the top-view and cross-section SEM of the cathodes without pressure treatment and after 25 MPa treatment, exhibiting obviously decreased thickness from 109.3 µm to 59.5 µm.

The electrochemical performance of cathodes in different density after pressure treatment is tested as shown in FIG. 12. The dense cathode with a remarkable density of 1.54 g cm$^{-3}$ exhibits high volume capacity of 1060.3 mAh cm$^{-3}$.

The porosity is calculated corresponding to cathodes in different density as shown in FIG. 13. Compared with the loose structure of cathode without pressure treatment (porosity: 52.7%), the dense cathode after 25 MPa treatment maintains an extremely low porosity of 13.3%. The dense cathode with low porosity can favorably reduce the electrolyte amount for wetting electrode, thus elevating gravimetric energy density of Li—S battery.

Example 5

A mixture of S@pPAN, AFB and acetylene black is evenly dispersed in deionized water in a mass ratio of 8:1:1. After stirring, a viscous slurry is obtained and casted on carbon-coated aluminum current collector. The cathode is prepared after totally drying with mass loading of 8 mg cm$^{-2}$. The S@pPAN is synthesized via pyrolyzing the mixture of sulfur and PAN in a mass ratio of 10:1 for 10 hours at 300° C. under N$_2$ atmosphere. The AFB is prepared using the same method mentioned in Example 1.

Li—S battery is assembled using lithium metal as anode, S@pPAN as cathode and 1 M LiPF$_6$/EC-DMC-FEC (1:1:0.1 in volume). The battery is tested in the voltage range of 1.0-3.0 V (vs. Li/Li$^+$).

The electrolyte amount is controlled in 2.5-1.0 mL gs$_{@p}$PAN$^{-1}$ to explore the performance of Li—S battery under lean electrolyte. As shown in FIG. 12, even with low electrolyte amount to 1.0 mL g$_{S@p}$PAN$^1$, the battery reveals normal behavior at initial cycles and maintains a benign sulfur utilization of 84% at second cycle.

Example 6

This example is similar with example 1. The difference is that AFB is mixed with S@pPAN and the conductive agent in a mass ratio of 90:5:5. The AFB is prepared using the same method mentioned in Example 1.

Example 7

This example is similar with example 1. The difference is that AFB is mixed with S@pPAN and the conductive agent in a mass ratio of 70:15:15. The AFB is prepared using the same method mentioned in Example 1.

Example 8

This example is similar with example 1. The difference is that when using sulfur and PAN to synthesize S@pPAN, the molecular weight of used PAN is 10 K.

Example 9

This example is similar with example 1. The difference is that when using sulfur and PAN to synthesize S@pPAN, the molecular weight of used PAN is 100 K.

Example 10

This example is similar with example 1. The difference is that when using sulfur and PAN to synthesize S@pPAN, the molecular weight of used PAN is 150 K.

Example 11

This example is similar with example 1. The difference is that when using sulfur and PAN to synthesize S@pPAN, the molecular weight of used PAN is 300 K.

Example 12

This example is similar with example 1. The difference is that when using sulfur and PAN to synthesize S@pPAN, the molecular weight of used PAN is 500 K.

Example 13

This example is similar with example 1. The difference is that when using sulfur and PAN to synthesize S@pPAN, the molecular weight of used PAN is 700 K.

Example 14

This example is similar with example 1. The difference is that when using sulfur and PAN to synthesize S@pPAN, the molecular weight of used PAN is 1000 K.

Example 15

This example is similar with example 1. The difference is that the sulfur content of S@pPAN is 30 wt. %.

Example 16

This example is similar with example 1. The difference is that the sulfur content of S@pPAN is 40 wt. %.

Example 17

This example is similar with example 1. The difference is that the sulfur content of S@pPAN is 45 wt. %.

Example 18

This example is similar with example 1. The difference is that the sulfur content of S@pPAN is 50 wt. %.

Example 19

This example is similar with example 1. The difference is that the sulfur content of S@pPAN is 55 wt. %.

Example 20

This example is similar with example 1. The difference is that the sulfur content of S@pPAN is 60 wt. %.

Example 21

This example is similar with example 1. The difference is that aluminum foil is used as current collector.

Example 22

This example is similar with example 1. The difference is that aluminum mesh is used as current collector.

Example 23

This example is similar with example 1. The difference is that carbon-coated aluminum mesh is used as current collector.

Example 24

This example is similar with example 1. The difference is that carbon-coated nickel mesh is used as current collector.

Example 25

This example is similar with example 1. The difference is that nickel foam is used as current collector.

Example 26

This example is similar with example 3. The difference is that the mass ratio of CNTT and acetylene black is 2:1.

Example 27

This example is similar with example 3. The difference is that the mass ratio of CNTT and acetylene black is 1:1.

Example 28

This example is similar with example 3. The difference is that the mass ratio of CNTT and acetylene black is 1:2.

Example 29

This example is similar with example 3. The difference is that the mass ratio of CNTT and acetylene black is 1:4.

Example 30

This example is similar with example 3. The difference is that the mass ratio of CNT and acetylene black is 2:1.

Example 31

This example is similar with example 3. The difference is that the mass ratio of CNT and acetylene black is 1:1.

Example 32

This example is similar with example 3. The difference is that the mass ratio of CNT and acetylene black is 1:2.

Example 33

This example is similar with example 3. The difference is that the mass ratio of CNT and acetylene black is 1:3.

Example 34

This example is similar with example 3. The difference is that the mass ratio of CNT and acetylene black is 1:4.

Example 35

This example is similar with example 3. The difference is that the mass ratio of CNF and acetylene black is 2:1.

Example 36

This example is similar with example 3. The difference is that the mass ratio of CNF and acetylene black is 1:1.

Example 37

This example is similar with example 3. The difference is that the mass ratio of CNF and acetylene black is 1:2.

Example 38

This example is similar with example 3. The difference is that the mass ratio of CNF and acetylene black is 1:3.

Example 39

This example is similar with example 3. The difference is that the mass ratio of CNF and acetylene black is 1:4.

Example 40

This example is similar with example 3. The difference is that the mass ratio of graphene and acetylene black is 2:1.

Example 41

This example is similar with example 3. The difference is that the mass ratio of graphene and acetylene black is 1:1.

Example 42

This example is similar with example 3. The difference is that the mass ratio of graphene and acetylene black is 1:2.

Example 43

This example is similar with example 3. The difference is that the mass ratio of graphene and acetylene black is 1:3.

Example 44

This example is similar with example 3. The difference is that the mass ratio of graphene and acetylene black is 1:4.

Example 45

This example is similar with example 3. The difference is that the mass ratio of GO and acetylene black is 2:1.

Example 46

This example is similar with example 3. The difference is that the mass ratio of GO and acetylene black is 1:1.

Example 47

This example is similar with example 3. The difference is that the mass ratio of GO and acetylene black is 1:2.

Example 48

This example is similar with example 3. The difference is that the mass ratio of GO and acetylene black is 1:3.

Example 49

This example is similar with example 3. The difference is that the mass ratio of GO and acetylene black is 1:4.

The above description of the examples aims to favor better understanding and operation of this invention towards people with ordinary skill in this technical field. People skilled in this technical field can easily make various modifications to these examples and apply the general principles described here to other examples without creative work. Therefore, the present invention is not limited to the examples mentioned above. All improvements and modifications inspired from this invention and made creative work should fall within the protection scope of this invention.

What is claimed is:

1. A flexible multifunctional cross-linking adhesive, consisting of a guar gum and a carboxylic styrene butadiene rubber, and the flexible multifunctional cross-linking adhesive is formed via an intermolecular cross-linking between hydroxyl groups contained in the guar gum and a carboxyl group of the carboxylic styrene butadiene rubber.

2. The flexible multifunctional cross-linking adhesive according to claim 1, wherein a mass ratio of the guar gum and the carboxylic styrene butadiene rubber ranges from 9:1 to 1:9.

3. The flexible multifunctional cross-linking adhesive according to claim 2, wherein the mass ratio of the guar gum and the carboxylic styrene butadiene rubber ranges from 3:1 to 1:3.

4. A preparation method of the flexible multifunctional cross-linking adhesive according to claim 1, including performing a co-solution method to cross-link the guar gum and the carboxylic styrene butadiene rubber.

5. A preparation method of a cathode for a Li—S battery comprising the flexible multifunctional cross-linking adhesive according to claim 1, including dispersing a mixture of the flexible multifunctional cross-linking adhesive, a sulfur-contained material, and a conductive agent in a mass loading of (7-9):(0.5-1.5):(0.5-1.5) in water to obtain a viscous slurry; coating the viscous slurry on a current collector; and performing drying and a pressure treatment on the current collector coated with the viscous slurry to obtain the cathode for the Li—S battery.

6. The preparation method of the cathode for the Li—S battery according to claim 5, wherein during a preparation process of the cathode for the Li—S battery, respectively preparing a guar gum aqueous solution and a carboxylic styrene butadiene rubber aqueous solution, wherein the guar gum aqueous solution and the carboxylic styrene butadiene rubber aqueous solution are mixed in a specific mass ratio and stirred to form a viscous milky white solution, the viscous milky white solution is directly used to prepare the cathode for the Li—S battery via an in-situ cross-linking method and an in-situ intermolecular cross-linking occurs during a cathode drying process, so as to obtain the flexible multifunctional cross-linking adhesive.

7. The preparation method of the cathode for the Li—S battery according to claim 5, wherein the conductive agent is composed of an acetylene black and an alternative carbon material, where the alternative carbon material includes carbon nanotube, carbon nanofibers, graphene or graphene oxide, the conductive agent is composed of the alternative carbon material and the acetylene black in a mass ratio ranging from 2:1 to 1:4, or the conductive agent is composed of the carbon nanotube and the acetylene black in a mass ratio ranging from 2:1 to 1:4.

8. The preparation method of the cathode for the Li—S battery according to claim 5, wherein the sulfur-contained material is a sulfur-based composite and is synthesized via pyrolyzing a mixture of sulfur and poly(acrylonitrile) in a mass ratio of (4-16):1 for 1-16 hours at 250-400° C. under $N_2$ or Ar atmosphere.

9. The application of the flexible multifunctional cross-linking adhesive The preparation method of the cathode for the Li—S battery according to claim 8, wherein a preparation process of the sulfur-contained material includes any one or more of the following conditions:

(I) a molecular weight of the poly(acrylonitrile) ranges from 10 K to 1000 K;

(II) a sulfur content of the sulfur-contained material ranges from 30 wt. % to 70 wt. %.

10. The preparation method of the cathode for the Li—S battery according to claim 5, wherein a pressure treatment of greater than 0 MPa to 20 MPa is conducted on the cathode to prepare a dense cathode, and a density of the dense cathode after the pressure treatment ranges from 0.8 g cm-3 to 1.6 g cm-3, corresponding to porosity of 10%-50%.

\* \* \* \* \*